Figure 1:
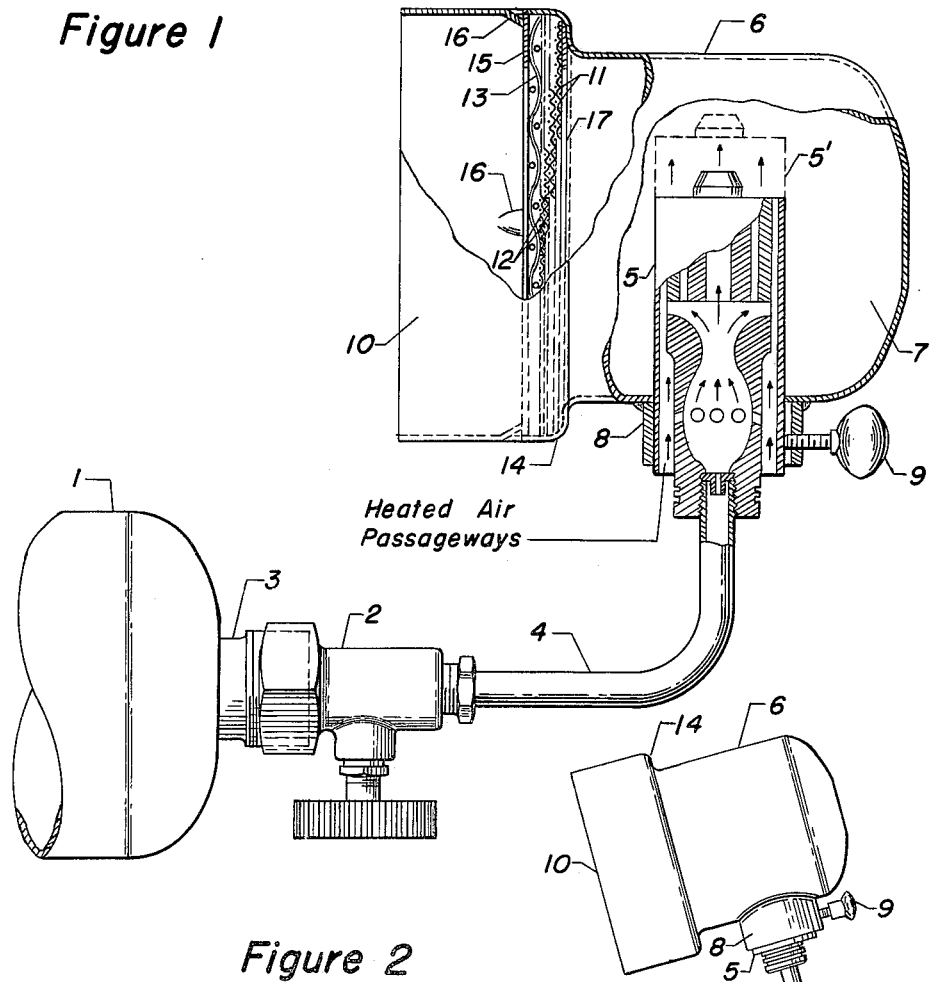

Jan. 18, 1966    T. J. HEBERT ETAL    3,229,680

PORTABLE INFRA-RED SPOT HEATER

Filed April 8, 1964

INVENTORS:
Truman J. Hebert
Norbert C. Ruff
BY:
ATTORNEYS 3,229,680
PORTABLE INFRA-RED SPOT HEATER
Truman J. Hebert and Norbert C. Ruff, Bloomer, Wis., assignors to Universal Oil Products Company, Des Plaines, Ill., a corporation of Delaware
Filed Apr. 8, 1964, Ser. No. 358,342
4 Claims. (Cl. 126—92)

This is a continuation-in-part of our present application Serial No. 92,373, filed February 28, 1961, now abandoned.

The invention is directed to a portable infra-red spot heater and more specifically to a special radiation burner construction with means for a heated aspirator and having an all metallic catalytic surface for use in combination with bottled liquified gases.

There are many instances when it is highly desirable to have a movable spot heating device, for example, for thawing out a water line or a gas line, heating a frozen brake drum assembly, heating a motor, heating painted surfaces to soften the paint and effects its removal and also to use as an ice-hole heater for fishermen. In some operations that are carried out around the home or shop, it is possible to use electrical heaters to do a heat treating or thawing job; however, for truckers, campers, fishermen, etc., who are away from a close electrical source, there are many advantages to having a portable heat source as may be supplied by a small liquified gas container having a suitable radiant heat output head. Even though electricity may be available, there are also operations where a portable gas burner is of much greater convenience than an electric heater, in that it eliminates the need of a long electrical extension cord, or in that it provides easy adjustability of the heat output by the mere adjustment of the gas flow from the tank or container.

It is a particular object of the invention to provide a radiation burner which embodies an all-metallic catalyst surface to effect the oxidation of gaseous fuel and is mounted in combination with a small portable gas container.

It is also an object of the invention to provide a radiation burner mounting and support arrangement which permits the use of the apparatus at subfreezing temperature conditions so as to preclude frosting or ice formation in the gas supply line, or in the air inspirator section, to preclude any resutling faulty operation.

In the use of bottled liquified gases there are operational problems in attempting to use them under extremely cold temperatures. Compressed gases tend to cool upon evaporation, and, in addition, extreme cold tends to slow up the evaporation of the gas supply from a small portable tank, such that as a result it has frequently been found impracticable to utilize them out-of-doors in an extremely cold climate. The gas supply line to the air inspirator and the air inspirator itself tend to close off when operating at very low temperatures due to frosting and small quantities of ice that are formed as the gas flows from the container. It is thus a principal feature of the present invention to provide a burner housing and gas nozzle-air inspirator arrangement in combination with a catalytically activated screen such that there is some heat radiation conducted backwardly into a substantially enclosed portion of the housing, or plenum section, such that during the heater operation the gas line, the gas outlet nozzle and air inspirator openings are kept from freezing. In other words, vaporized gas outlet, together with the air inspirator means, are substantially enclosed within the burner housing and are warmed during the operation of the device. The connecting gas line is preferably kept short and formed of relatively stiff material, such as of brass, copper or aluminum tubing and is bent at an angle such that there is a certain amount of heat radiated to and conducted through the gas line. A rotatable connection of the burner housing to the end of the gas supply line also permits directing the burner outlet end over, or along side of, the small liquidfied gas container such that there may be some heating of the latter to assist in the vaporization of the liquified gas supply.

In a broad aspect, the present invention provides a portable infra-red heat radiation heating apparatus adapted to utilize liquified gases, which comprises in combination, a gas supply tube connecting to a gas nozzle-air inspirator member, a burner housing having an open-ended tubular passageway providing for the removable positioning of said air inspirator member therein, said housing also having an open heat outlet end with at least one catalytically activated perforate metallic member positioned laterally thereacross and at least one perforate fuel-air diffusing member extending across the interior of the housing adjacent the inner face of said catalytic member, with the latter members thus enclosing the housing and said gas nozzle-air inspirator member within the remaining interior section whereby fuel and streams are preheated as they enter said inspirator member and a resulting preheated stream of vaporized fuel in admixture with air into the interior of the housing, then passes through said catalytic member and provides for the radiation of infra-red heat therefrom as the fuel is catalytically oxidized.

In a somewhat more specific embodiment, the present invention provides a portable infra-red radiation heating unit adapted for use with liquified gases and comprises in combination, an open-ended burner housing, at least one perforate catalytically activated metallic member positioned laterally across the interior of the housing adjacent the open end thereof, at least one air-fuel diffusing-reflector screen member extending across the interior of the housing adjacent the inner face of the catalytic member, said members forming a confined fuel-air plenum section within the remaining substantially closed inner portion of the housing, a gas outlet nozzle-air inspirator member extending thorugh a tubular passageway section into the side of said housing and into the plenum section, a gas supply tube connecting said nozzle-air inspirator member with a fuel supply source, and adjustable valving means in said gas supply tube whereby to regulate a resulting vaporized fuel-air mixture at the surface of said catalytically activated member and provides an adjustable infra-red heat source therefrom.

Various types of catalytic members and types of catalytic coatings may be utilized to provide an oxidizing and infra-red heat radiation surface; however, in a preferable arrangement, a catalytic coating is applied to an alloy metal screen of relatively fine mesh to serve as the catalytic member. In some instances, a single layer of activated screen may sufficiently effect the oxidation of the fuel-air vaporous mixture. However, generally better results have been obtained with the use of at least two catalytically activated alloy screen members laying together across the burner opening to serve as the radiation surface. A similar type of screen, although not catalytically activated, may serve as a gas distributing and diffusing member adjacent the interior surface of a catalytic member. In the present embodiment, it is desirable to have adequate diffusion of the gas mixture from the plenum section to the catalytic surface, as well as have means to preclude excessive heat radiation backwardly toward the gas supply nozzle whereby back flashing may readily take place. However, it is undesirable to stop all of the backward radiation of heat therefrom, since it is desired to have some heating of the fuel outlet nozzle and air inspirating member.

Reference to the accompanying drawing and the following description thereof will serve to clarify the improved construction of the portable infra-red heating apparatus of this invention as well as point out the advantageous features in connection therewith.

FIGURE 1 of the drawing is an elevational view, partially in section, showing the construction and arrangement of the radiation burner housing and the related parts.

Figure 2:
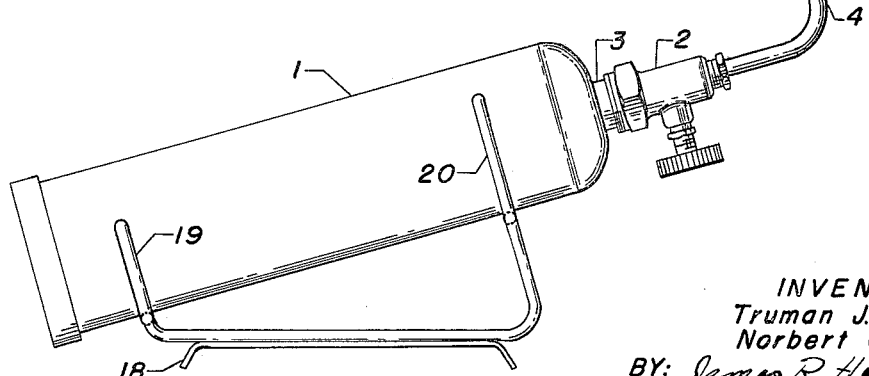

FIGURE 2 of the drawing diagrammatically indicates, in an elevational view, one arrangement of a small liquified gas container in combination with a suitable cradle type of support means and a demountable radiation burner housing connected with the gas container through the use of a bent tube and an adjustable rotatable connecting collar.

Referring now specifically to FIGURE 1 of the drawing, there is indicated a liquified gas bottle or container 1 having an adjustable valving means 2 connecting with the container outlet 3 and a short length of bent tubing 4. The gas supply tubing 4, as previously pointed out, is preferably formed of a relatively stiff material having sufficient strength to maintain its position and shape when supporting a superimposed burner housing. At the end of the tube 4 is attached a suitable gas outlet nozzle and air inspirator member 5 which may be of any conventional design adapted to effect the aspiration and mixing of air with the vaporized fuel stream passing from container 1 upon the opening of valve 2. There are many forms of air inspirators which utilize the gas supply flow to aspirate an air supply and cause air mixing with the fuel, and it therefore is not intended to limit the present invention to any one commercial type of air inspirator. In other words, the member 5 shown in the drawing is intended to be merely diagrammatic. However, in accordance with an advantageous feature of this invention, the outlet nozzle-air inspirator member 5 is caused to be positioned substantially within a housing 6 which in turn has a substantially enclosed plenum section 7. Access to the plenum section 7 is provided by an open tubular section 8 on the side of the housing 6, and is preferably of a size permitting easy insertion or withdrawal of member 5 with respect to the interior of the plenum 7. A set screw or thumb screw 9 through the side of section 8 provides a means for adjustably clamping the housing 6 to the air inspirator member 5, or the end of tubing 4. The opening at the end of tubular section 8 permits an adequate supply of air to the various shielded air inlet holes in the inspirator 5. Further, a thumb screw tightening arrangement also permits the placement of housing 6 in any desired position, through 360° of rotation, with respect to the gas supply container 1 and the bent tube member 4. In the position shown, heat is radiated from the open end portion 10 of the housing 6 and caused to flow parallel with and over the surface of the container 1, such that there is some degree of heating of the liquified gas in the tank. On the other hand, where temperature conditions permit, if the housing 6 is rotated through 180° from the position indicated in the drawing, then radiant heat is directed away from the liquified gas container.

In operation, a fuel-air mixture is caused to flow from the plenum section 7 through diffusion screens 11 and thence through catalytically activated screens 12. Resulting oxidized gases and radiant heating from the latter screens will flow outwardly through the open end portion 10 of the housing 6 to any desired object that is to undergo heating. In the present specific embodiment, two catalytically activated screens 12 are shown as being held in place between an outer protective screen 13 and inner gas diffusing screens 11. Because of the high temperature operation, the diffusing screens 11 are preferably supplied of a high temperature resistant alloy such as of Nichrome, Chromel, or other chrome-nickel alloy. They also are preferably fabricated of small diameter wire of the order of .01 inch in diameter, with the mesh being in the range of from 30 to 60; however, it is not intended to limit the apparatus to the use of a predetermined number of diffusing members or to any one size of screening or mesh. Two 40 mesh screens have served, in a specific embodiment, to sufficiently reduce backward radiation to preclude backflashing while giving suitable diffusion.

The catalytically activated screen members 12 are likewise provided of a high temperature resistant material, with the base material being generally similar to that set forth in connection with the gas diffusing members 11. Also, they may have a size of wire and mesh which are of a similar size and range. The catalytic coating of the members 12 may comprise a platinum, palladium or platinum group metal coating, either alone or in combination with one of the other members of the group. Also, small percentages of other activating components such as thorium, ruthenium, tungsten, caesium and the like, may be applied in combination with the platinum group metal. Deposition may be carried out in a manner similar to that set forth in the Suter et al. U.S. Patent No. 2,720,494 issued October 11, 1955. This patent sets forth means for activating alloy metal wire or screen to provide a desirable form of gas oxidizing or incinerating element, and it is believed unnecessary to go into detail of applying the activated coating in connection with the portable infra-red heating device of this invention, reference being made to such patent for further description thereof.

Various means may also be utilized to position the catalytically activated members 12 and the diffusing members 11 across the open end of the housing 6; however, in a preferred embodiment, the members are removably inserted from the exterior of the housing, whereby there may be periodic replacements of the elements in the device, if desired. The arrangement of FIGURE 1 provides an offset wall section 14 and an enlarged open-ended section 10, such that the screen members 11, 12 and 13 may be inserted through the open end and placed against the offset or "seat-like" portion being provided by wall section 14. A relatively stiff retainer ring 15 is placed on top of the screen members and the entire assembly held in place by inwardly projecting prongs or dimpled sections 16.

The outer protective screen 13, indicated between the activated members 12 and the outer retainer ring 15, is, of course, provided of a relatively large mesh so as to not interfere with the heat radiation from the catalytic surface, but is generally of a high temperature resistant alloy which will tend to hold its shape under high temperature conditions. A larger diameter wire of the order of .04" to .08" may be used for the protective screen 13; however, again it is not intended to limit the present invention to the use of any one type of wire or size of mesh in combination with the assembly. A preferred embodiment of the invention may also utilize an insulating material 17 between the gas diffusion screens 11 and the housing 6, at the zone of the offset section 14, in order to substantially reduce heat conduction to the periphery of the housing. Such insulation 17 may comprise an asbestos type of material, mineral wool or a compressed fiber having insulating qualities.

The housing 6 is indicated as being formed in a cylindrical shape; however, such housing need not be of a round cross-section since a square or rectangular shape, or other multi-sided configuration, will be useable, but perhaps not to the same degree of efficiency. The size and shape is, of course, correlated with the size of the gas supply line and the gas outlet-air inspirator member, etc., such that the resulting fuel-air mixture may be introduced into the plenum chamber 7 and caused to flow uniformly across the cross sectional area of the housing 6, and in turn flow uniformly to the catalytic surfaces of screens 12 to provide the desired infra-red radiation therefrom.

In other words, the housing 6 could be made too large with respect to the gas supply being provided from the container 1.

At the open end of the housing 6, in the enlarged section 10, the radiant surface, as provided by screen members 12, is preferably set in a short distance so that at least a portion of the wall portion 10 serves as a wind protecting shield, as well as serving to direct the radiant heart therefrom in a "spot-like" manner. Other means, other than the peripherally spaced and inwardly dimpled sections 16, may be used to removably hold the assembly of screen members in place, as, for example, spaced set screw means around and through the periphery of the housing portion 10 would provide suitable removable holding means. At the air inspirator opening and tubular section 8, other holding means may also be utilized to clamp the housing 6 to the end of the gas supply tube 4, or to the air inspirator member 5. For example, here again a plurality of spaced set-screw members, rather than a single thumb screw 9, may project through the wall of the passageway section 8 and engage the tube member 4, or the inspirator member 5, to effect the desired attachment and positioning of the housing 6. In each instance, however, it is desired that the air inlet openings to the aspirator member 5 be within the interior of the housing 6, or at least within the confines of the tubular member 8, so as to preclude frost formation on the intake holes thereof. The dashed line 5' shows that the air inspirator member 5 may be inserted into the housing 6 still further with clamp screw 9 holding against the tube 4. The air intake through the open end of the tubular section 8 is such that under subzero conditions the air is well preheated and there is no chance of frost on the air inlet holes of the member 5.

Referring now to FIGURE 2 of the drawing, there is indicated a cradle type of container supporting means having a base member 18 and the respective cradle-like support member 19 and 20. A preferred design has one cradle supporting member, such as 19, positioned at a lower elevation than the other supporting member 20, so that the tank 1 is held in an angular position with respect to either a horizontal or vertical plane. A preferred embodiment also permits the tank or bottle to be rotatively movable within the support members 19 and 20 such that the positioning of the burner housing 6 may in turn be elevated or lowered by rotation of tank 1. Where deformable bars or wire-like members are used for cradles 19 and 20, then there may be some manual bending and modification to one or both of the supports so that the angle the container 1 takes with respect to the horizontal base 18 may be modified. FIGURE 2 also indicates more clearly than FIGURE 1 how the housing 6 will cause the infra-red heat radiation from the open end of the housing to flow outwardly and downwardly over the tank or container 1 to in turn cause the heating of the latter, as well as provide the heating of a zone beyond the lower end of the bottle, such as a hole in ice and a fishing line in connection with ice fishing. Actually, the end of the bent tube 4, which projects outwardly and connects with the air inspirator in the housing 6, is fabricated to be rather short, i.e., about equal to or not substantially longer than, one-half the diameter of the container 1, such that the radiant heat from the housing can sweep backwardly along the exterior wall of the container. In other instances, where one is not concerned with subfreezing temperatures, as, for example, in the heating of a particular object, the housing 6 may be rotated 90° away from the container 1 and caused to impinge its radiant heat therefrom to a given item at the level of the support member 18. In still another instance, the housing 6 can be rotated with respect to the bent tube member 4 by adjustment of the thumb screw 9 such that the open end 10 of housing 6 points directly away from the outlet end of the continer 1 and impinge upon a particular point or surface in line therewith. Tube 4 is bent to have an inside angle of from 80° to 90° such that various combinations of placement may be obtained between the tank and the housing 6. Of course, where one is using a small liquified gas container the entire device may be held in one's hand and the radiant heat from the burner housing may be directed at any desired point or distance therefrom. The smallness of the unit and the portability also permits one to hold it at any optimum point to effect the thawing of a gas line or water line. Although not shown in the drawing, a properly sized metal insert placed within the tube 4, at the zone of bend therein, substantially precludes liquid propane from flowing into the air inspirator or the housing 6 when the tank is raised higher than the level of the housing. However, by having a tank support and the tank rotatable in the cradle members of the stand 18, as well as having the burner housing rotatable around the end of the bent tubing member 4, permits the holding of a substantially fixed position without manually holding the device. Also, the use of the adjustable valving means 2 permits adjustment of the actual heat radiation through a relatively wide range of temperatures which may range from a "black" radiant heat range to an intense red high temperature non-flaming infra-red heat.

The lighting of the apparatus may be carried out by a match, cigarette lighter, or similar igniting means. Generally there will be a small amount of flame emitted upon the initial igniting of the mixture as it leaves the unit and catalytic members; however, as soon as the catalytic activity takes over and there is a fuel-air catalytic oxidation reaction spread across the catalytic surface, the flame will disappear and the catalytic oxidation will take over at non-flame, non-oxidizing conditions, with the amount of infra-red heat being controllable, as hereinbefore set forth, by a desired adjustment valving means.

We claim as our invention:

1. A portable infra-red radiation heating apparatus for use with liquified gases adapted to operate at subfreezing temperatures without frost or ice formation in any portion thereof and comprising in combination, an open-ended burner housing, at least one perforate catalytically activated metallic member positioned laterally across the interior of said housing adjacent the open end thereof, at least one metal fuel-air diffusing-reflector member extending across the interior of said housing adjacent the inner face of said catalytic member, said members across said housing thereby forming a confined fuel-air plenum section within the remaining substantially closed inner portion of said housing, a projecting tubular section formed on said housing and connecting with said plenum section, a gas outlet nozzle-air inspirator member in heat exchange relation with and extending through said tubular section into the housing to receive backward reflected heat from the defusing reflector member which warms the fuel outlet nozzle and air inspirating member, said inspirator having an elongated tubular portion which encompasses a tubular fuel-air mixing section thereby to form an annular air intake and passageway therebetween, the air intake to said inspirator being positioned within the confines of the tubular section of the housing and in heat exchange relation therewith to provide a heated air inlet passageway whereby the fuel-air mixture is formed within the confines of said plenum section, a gas supply tube adapted to connect said nozzle-air inspirator member with a fuel supply source.

2. The apparatus of claim 1 further characterized in that said tubular section to said burner housing has set screw means through the side thereof to engage said gas outlet nozzle-air inspirator member, whereby said housing may be mounted over and clamped around said air inspirator member and the end of said gas supply tube at any position through 360° of rotation.

3. The apparatus of claim 1 further characterized in that said perforate catalytic activated member and said fuel-air diffusing-reflector member extending across the open end of said housing are removably held in place therein, whereby such members may be removed from the open end of said housing.

4. A portable infra-red radiation heating apparatus for use with liquified gases adapted to operate at subfreezing temperatures without frost or ice formation in any portion thereof and comprising in combination, an open-ended burner housing, at least two catalytically activated metallic screen members positioned laterally across the interior of said housing adjacent the open end thereof, at least two metallic screen-like diffusing-reflector members extending across the interior of said housing adjacent the inner face of said catalytic screen members, said members cooperating with said housing to form a substantially confined fuel-air plenum section within the remaining inner portion of said housing, a projecting tubular section formed on said housing and connecting with said plenum section, a gas outlet nozzle-air inspirator member in heat exchange relation with and extending through said tubular section into the interior of said plenum section of said housing to receive backward reflected heat from the defusing reflector member which warms the fuel outlet nozzle and air inspirating member, said inspirator having an elongated tubular portion which encompasses a tubular fuel-air mixing section thereby to form an annular air intake and passageway therebetween, the air intake to said inspirator being positioned within the confines of the tubular section of the housing and in heat exchange relation therewith to provide a heated air inlet passageway, a bent gas supply tube adapted to connect said nozzle-air inspirator member with a fuel supply source, adjustable valving means in said gas fuel supply tube to regulate a fuel-air mixture to said catalytic screen members and to adjust infra-red heat radiation therefrom, set screw means through said tubular section adapted to engage with said air inspirator member at the end of said gas supply tube, whereby said housing is attached to said member and to said gas supply source in a movably rotatable arrangement around the end of said tube and whereby the fuel-air mixture is both formed and released within a substantially enclosed plenum section positioned to receive a backward radiation of heat from said gas diffusing-reflector members and said catalytic screen members as infra-red heat is radiated from the latter upon the oxidation of the fuel-air mixture at the surface thereof.

References Cited by the Examiner

UNITED STATES PATENTS

| | | | |
|---|---|---|---|
| 873,485 | 12/1907 | Ball | 158—99 |
| 1,341,514 | 5/1920 | Moss | 126—271.2 |
| 2,658,742 | 11/1953 | Suter et al. | |
| 2,857,905 | 10/1958 | Vanderbeck | 126—38 |
| 3,029,866 | 4/1962 | Honger | 158—114 |
| 3,057,400 | 10/1962 | Wagner | 158—116 X |

FOREIGN PATENTS

| | | |
|---|---|---|
| 1,136,829 | 1/1957 | France. |
| 934,435 | 10/1955 | Germany. |
| 521,147 | 3/1955 | Italy. |
| 529,640 | 6/1955 | Italy. |
| 559,179 | 3/1957 | Italy. |

FREDERICK L. MATTESON, JR., *Primary Examiner.*

FREDERICK KETTERER, *Examiner.*